United States Patent [19]

Maeda

[11] Patent Number: 5,469,290
[45] Date of Patent: Nov. 21, 1995

[54] TWO-ELEMENT ZOOM LENS FOR BEAM SEPARATION ERROR CORRECTION

[75] Inventor: Patrick Y. Maeda, Redondo Beach, Calif.

[73] Assignee: Xerox Corporation, Stamford, Conn.

[21] Appl. No.: 254,713

[22] Filed: Jun. 6, 1994

[51] Int. Cl.$^6$ ............................................. G02B 26/08
[52] U.S. Cl. ..................... 359/210; 359/204; 359/216; 347/233
[58] Field of Search ........................ 359/196, 201, 359/204–106, 209–210, 213–219, 676–677, 691–692, 694, 696; 250/235–236, 578.1, 201.2, 201.4; 346/108; 347/225, 233

[56] References Cited

U.S. PATENT DOCUMENTS 4,390,235  6/1983  Minoura ................................. 359/204

Primary Examiner—James Phan
Attorney, Agent, or Firm—Fariba Rad

[57] ABSTRACT

A raster output scanner is disclosed which utilizes a spot separation error correction system prior to its rotating polygon mirror. The spot separation error correction system of this invention is a zoom system which comprises two axially adjustable lenses. By moving the two lenses in a predetermined relationship with each other, the magnification on the rotating polygon can be modified and as a result the spot separation on the photoreceptor can be substantially corrected.

4 Claims, 4 Drawing Sheets

TWO-ELEMENT ZOOM LENS FOR BEAM SEPARATION ERROR CORRECTION

BACKGROUND OF THE INVENTION

This invention relates to a raster output scanner with a multi-beam laser diode and, more particularly, to a raster output scanner which utilizes a zoom system to control the laser diode beam separation.

Referring to FIG. 1, a sagittal view of a conventional multi-beam raster output scanner 10 is shown which utilizes a multi channel laser diode 12, a collimating lens 14, a spot size control aperture 16, pre-polygon optics 18 and a scanning polygon mirror 20, a post polygon optics 22 and a photoreceptor plane 24. The collimating lens 14 receives several beams 26 from different channels of the laser diodes 12. The collimated light beams emerging from the collimating lens 14 start converging towards each other and they all cross each other at the center of the aperture 16.

The spot size control aperture 16 is used for clipping the light. After passing through the spot size control aperture 16, the collimated beams 26, which have crossed each other at the center of the aperture 28, start diverging from each other. The pre-polygon optics 18 focuses each beam 26 individually in the sagittal or cross-scan plane to a spot at a point near a facet of a rotating polygon mirror 20 while in the fast-scan plane the light beam remains collimated when the beam strikes the facet of the rotating polygon mirror.

The rotating polygon mirror 20 causes the reflected light beams to revolve about an axis near the reflection point of the rotating polygon mirror. For the purpose of simplicity, the rotating polygon mirror is shown as line 20 and the reflected light beam from the rotating polygon mirror 20 is unfolded. The post polygon optics images the reflected light beams onto the photoreceptor plane 24. The reflected light beams can be utilized to scan a document at the input end of an imaging system as a raster input scanner or can be used to impinge upon a photosensitive medium, such as a xerographic drum (photoreceptor), in the output mode as a raster output scanner. At the photoreceptor plane 24, there is a distance 30 between the centers of adjacent spots which hereinafter is referred to as "spot separation".

In multi-beam scanning systems, the spot separation 30 is an important element. Simultaneous scanning of multiple spots requires a selection of a precise spot separation at the photoreceptor plane. However, the spot separation is sensitive to fabrication errors and the manufacturing tolerances of the multi-beam light source spacing, pre-polygon optics, post-polygon optics, optomechanical housing, etc. The fabrication errors or the manufacturing tolerances of each individual element or the combination of the elements will cause an error in the spot separation.

Typically, in conventional scanning systems, any adjustment made to compensate for the spot separation errors is not satisfactory since while the adjustment corrects the spot separation, it also causes the spots to go out of focus.

An other approach to correct the spot separation errors is to tighten the tolerances of the various components that contribute to the spot separation errors. However, this recourse is cost prohibitive and impractical.

It is an object of this invention to provide optical means to correct the spot separation errors, caused by the manufacturing tolerances of the optical elements of the raster scanner, in the cross-scan plane.

SUMMARY OF THE INVENTION

In accordance with the present invention, a spot separation error correction system is positioned between a collimator and a polygon of a laser diode raster scanner optical system. The spot separation error correction system, which comprises two axially adjustable lenses, provides an adjustment system which changes the magnification of the entire system without changing the image plane. This will cause the spot separation on the rotating polygon mirror to change while the spots remain in focus on the polygon mirror. The spot separation change on the polygon mirror also changes the spot separation on the photoreceptor and since the spots on the rotating polygon mirror are in focus, the spots on the photoreceptor plane also stay in focus.

DESCRIPTION OF THE PREFERRED EMBODIMENT

Figure 1:
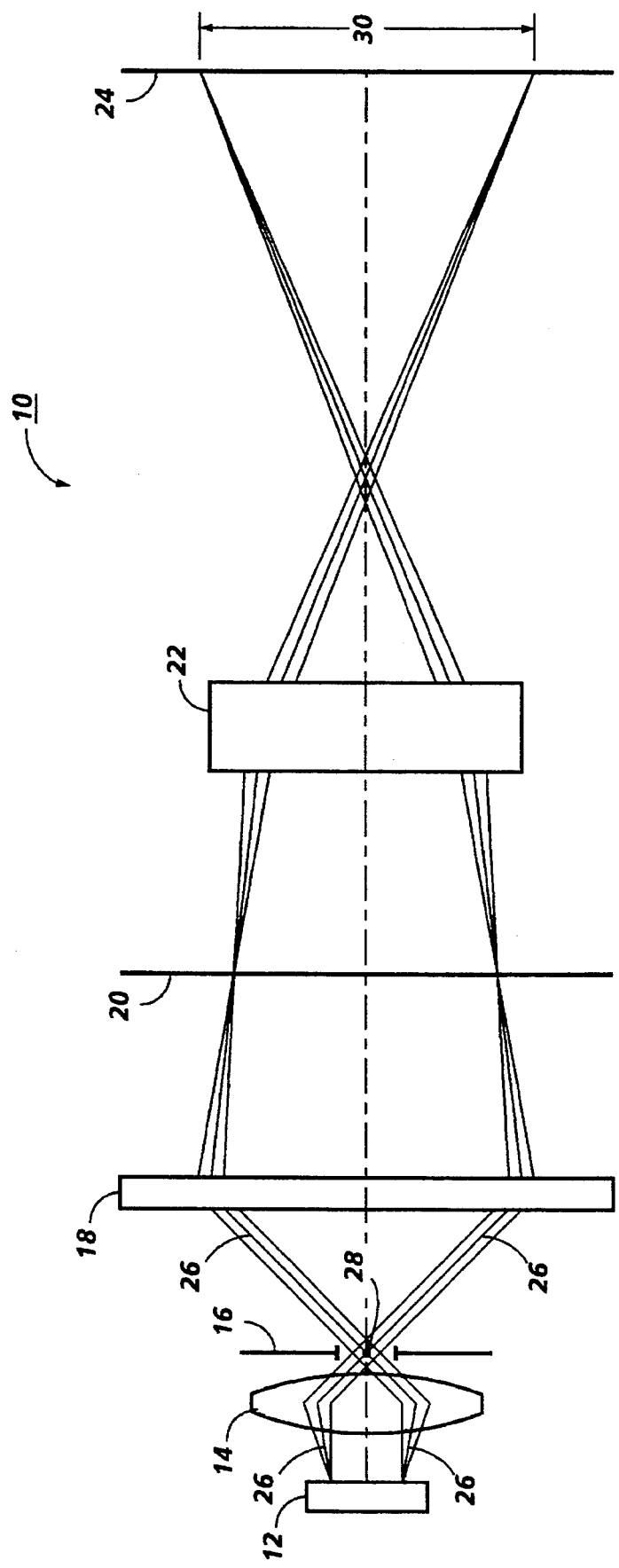
FIG. 1 shows a prior art raster output scanner.
Figure 2:
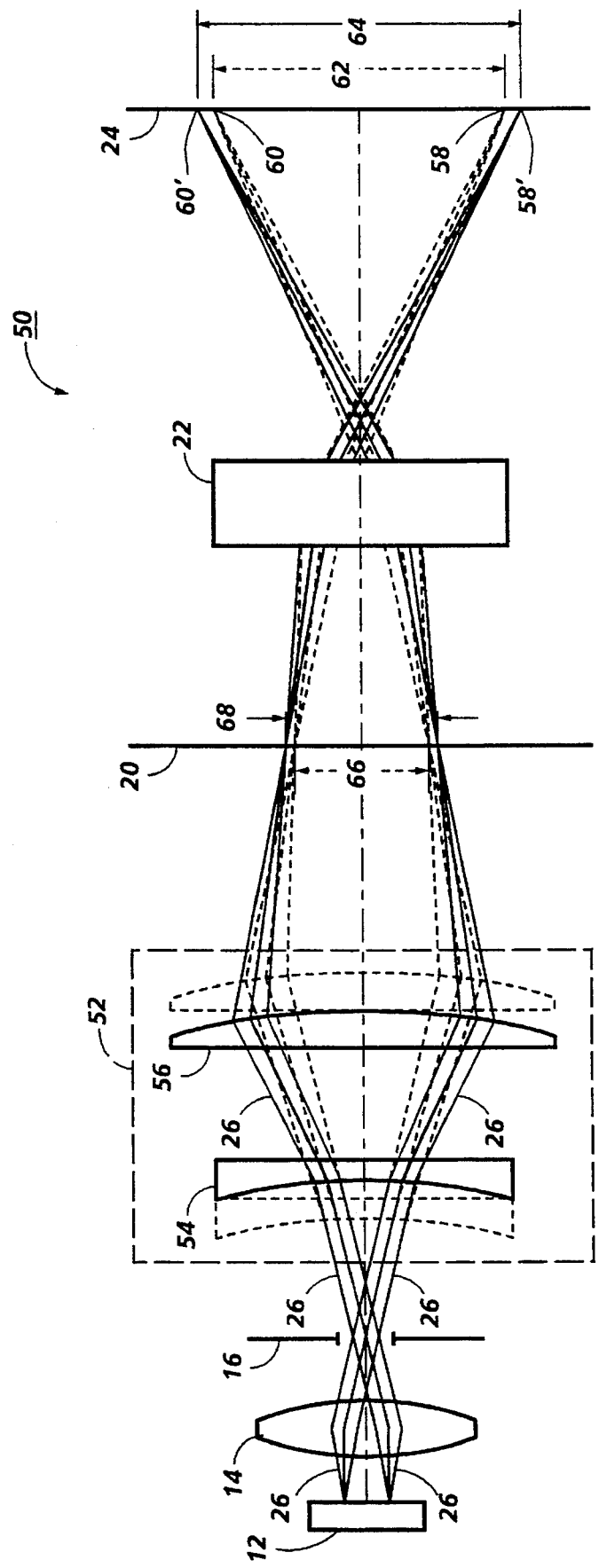
FIG. 2 shows a raster output scanner of this invention with a spot separation error correction system.

Reference is now made to FIG. 2 wherein there is disclosed a raster scanner optical system 50 of this invention. In this invention the prior art pre-polygon optics 18 of FIG. 1 is replaced by the spot separation error correction system 52.

A multi-channel laser diode 12 emits multiple light beams onto the collimating lens 14 and the collimating lens collimates the light beams and sends them to a rotating polygon mirror 20 through a control aperture 16 and the spot separation error correction system 52 respectively. Again in FIG. 2, for the purpose of simplicity, the rotating polygon mirror is shown as line 20 and the reflected light beam from the rotating polygon mirror 20 is unfolded.

The spot separation error correction system 52 focuses each beam 26 individually in the sagittal or cross-scan plane to a spot on a facet of a rotating polygon mirror 20. In practical applications, the light beams may focus near a facet in a range of ±1 millimeter from the facet. For the purpose of this application, the term "on the facet" shall include this range. In the fast-scan plane the light beams remain collimated when the beams strike the facet of the rotating polygon mirror.

The rotating polygon mirror 20 causes the reflected light beams to revolve about an axis near the reflection point of the rotating polygon mirror. The post polygon optics 22 images the reflected light beams onto the photoreceptor plane 24.

The spot separation error correction system 52 which is a variable power system or a zoom system, corrects the spot separation error caused by manufacturing tolerances of any of the optical elements of the raster scanner 50. For simplicity, hereinafter, the spot separation error correction system 52 will be referred to as "zoom system 52".

The zoom system 52 adjusts the cross scan magnification of the whole system to achieve the desired spot separation. The zoom system 52 contains two axially adjustable lenses 54 and 56. The two lenses 54 and 56 are cylindrical in the sagittal or cross-scan plane and plano in the fast-scan plane. Therefore, the collimated light beams 26 in the fast scan plane remain collimated and in the cross-scan plane are focused on the facet of the rotating polygon mirror 20.

In operation, due to the aforementioned reasons, the light beams 26 may focus on the photoreceptor with a spot separation other than the required spot separation of the raster output scanner. For example, the light beams may focus at points such as 58 and 60 on the photoreceptor plane 24 in which case the spot separation will be 62. However, the required spot separation is 64.

The approach of this invention to correct the spot separation error is to adjust the spot separation on the rotating polygon mirror which causes the spot separation on the photoreceptor to change. Therefore, in order to increase the spot separation on the photoreceptor 24 from 62 to 64, the spot separation on the polygon should be increased from 66 to 68.

Figure 3:
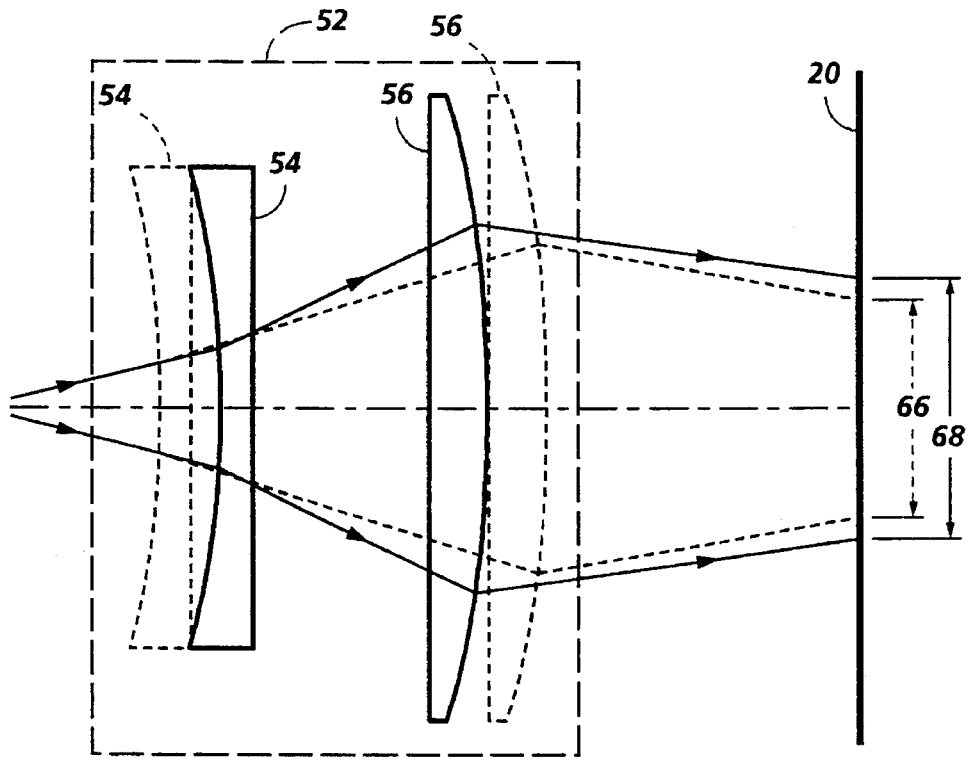
FIG. 3 shows the spot separation error correction block of FIG. 2 being adjusted for an increased magnification.
Figure 4:
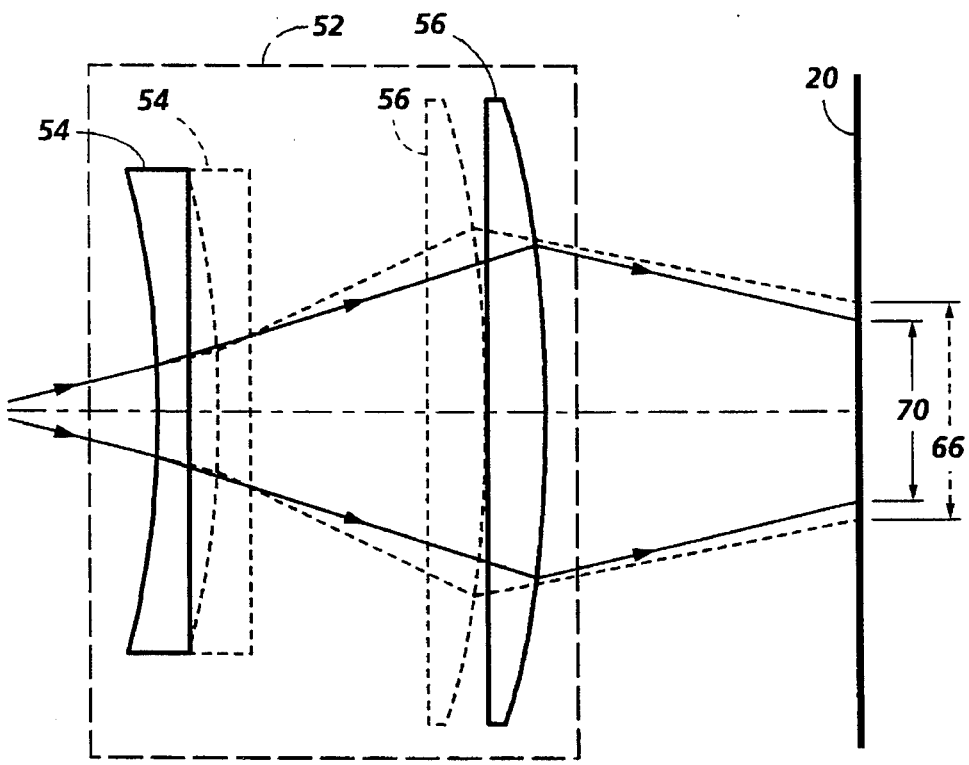
FIG. 4 shows the spot separation error correction block of FIG. 2 being adjusted for a decreased magnification.

Referring to FIGS. 3 and 4, there are shown two examples of adjusting the two lenses 54 and 56 of the zoom system 52. In FIGS. 2, 3 and 4, the dashed lines represent the light beams traveling through the raster scanning system 50 which is not adjusted to correct the spot separation error and the solid line represent the light beams traveling through the raster scanning system 50 which is adjusted to correct the spot separation error. Also, the unadjusted positions of the lenses 54 and 56 are shown by dashed lines and the adjusted positions of the lenses 54 and 56 are shown by solid lines.

Referring to FIGS. 3 and 4, as it can be observed, by adjusting the two lenses 54 and 56, the magnification of the zoom system changes which causes the spot separation on the rotating polygon mirror 20 to change. However, since the spot separation error correction system is a zoom system, by moving the two lenses with a pre-determined relationship with each other, the focal length of the system changes, but the image plane stays stationary.

For example in FIG. 3, by moving the two lenses 54 and 56 towards each other (from the positions shown by dashed lines to the positions show by solid lines), the focal length of the zoom system increases. Therefore, the spot separation on the rotating polygon mirror will increase from 66 to 68. However, referring to FIG. 4, by moving the two lenses 54 and 56 away from each other, the focal length of the zoom system will decrease. Therefore, the spot separation on the rotating polygon mirror will decrease from 66 to 68.

Referring back to FIG. 2, by adjusting the two lenses 54 and 56 in a predetermined relationship with each other, the magnification on the polygon can be increased. By increasing the magnification, the spot separation on the rotating polygon increases and as a result the magnification on the photoreceptor plane also changes which causes the spot separation on the photoreceptor to increase. In the example of FIG. 2, after adjusting the zoom system 52, the light beams will focus on the photoreceptor plane 24 at points 58' and 60' in which case the spot separation will be 64 which is the required spot separation.

It should be noted that in the example of FIG. 2, the spot separation needed to be increased. However, by adjusting the zoom system, the magnification and as a result the spot separation can be increased or decreased as needed.

Figure 5:
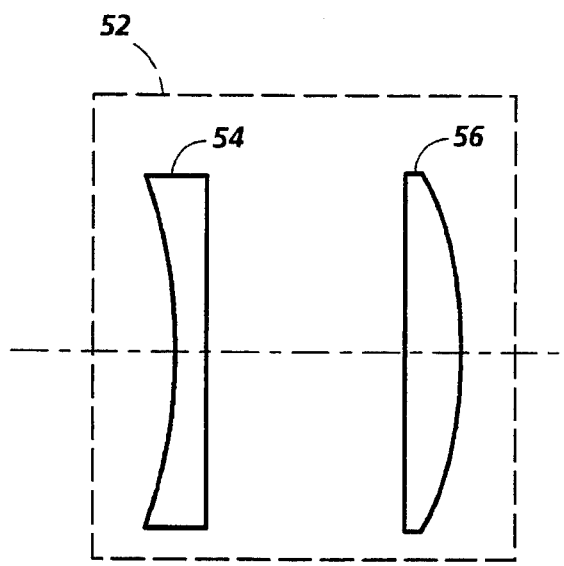
FIG. 5 shows the spot separation error correction block of FIG. 2 with a negative lens followed by a positive lens.
Figure 6:
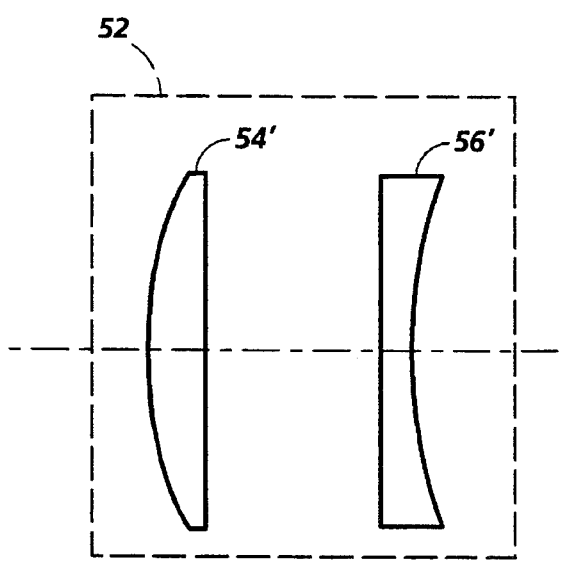
FIG. 6 shows the spot separation error correction block of FIG. 2 with a positive lens followed by a negative lens.
Figure 7:
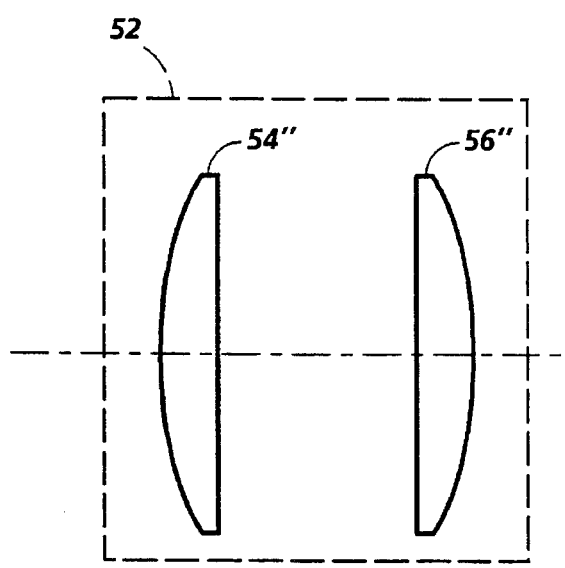
FIG. 7 shows the spot separation error correction block of FIG. 2 with two positive lenses.

Referring to FIGS. 5, 6 and 7, the zoom system 52 can have three different configurations: a negative lens 54 followed by a positive lens 56 (FIG. 5), a positive lens 54' followed by a negative lens 56' (FIG. 6) and two positive lenses 54" and 56" (FIG. 7)

It should be noted that the positive lenses can be designed to be either bioconvex, plano-convex, convex-plano, or meniscus shaped and the negative lenses can be designed to be either biconcave, plano-concave, concave-plano, or meniscus shaped.

It should also be note that in each configuration, there are pre-determined position for each of the two lenses for each magnification value throughout the variable power range of the zoom system. The pre-determined positions of the lenses can be achieved by manual adjustment, mechanical adjustment using a mechanical cam, or by other mechanical means.

What is claimed is:

1. A raster scanning system with spot separation error correction system comprising:

a light source for emitting a plurality of light beams;

a medium;

scanning means located between said light source and said medium for receiving the light beams and scanning the same in a fast-scan plane across said medium;

collimating means located between said light source and said scanning means for substantially collimating the light beams;

a spot separation error correction system for imaging the beams at an image plane on said scanning means in a cross-scan plane;

said spot separation error correction system having a first axially adjustable optical means being located in the path of the light beams between said collimating means and said scanning means;

said spot separation error correction system having a second axially adjustable optical means being located in the path of the light beam between said first axially adjustable optical means and said scanning means;

post scanning optical means being located between said scanning means and said medium for receiving the light beam from said scanning means and focusing the light beam onto said medium in both the fast-scan plane and the cross-scan plane; and said first axially adjustable optical means and said second axially adjustable optical means being so constructed and arranged relative to each other that upon moving said first axially adjustable optical means and said second axially adjustable optical means toward each other or away from each other in the axial direction at a pre-determined relationship with each other the image plane of said spot separation error correction system remains on said scanning means and the magnification on said scanning means changes which substantially corrects the spot separation error on said medium.

2. The raster scanning system recited in claim 1, wherein said first axially adjustable optical means is a negative lens and said second axially adjustable optical means is a positive lens.

3. The raster scanning system recited in claim 1, wherein said first axially adjustable optical means is a positive lens and said second axially adjustable optical means is a negative lens.

4. The raster scanning system recited in claim 1, wherein said first axially adjustable optical means and said second axially adjustable optical means are both positive lenses.

\* \* \* \* \*